US010487980B2

(12) United States Patent
Wiedemeier (10) Patent No.: US 10,487,980 B2
(45) Date of Patent: Nov. 26, 2019

(54) CYLINDRICAL PRESSURE VESSEL CLAMPING METHOD

(71) Applicant: Brandon J. Wiedemeier, San Diego, CA (US)

(72) Inventor: Brandon J. Wiedemeier, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 164 days.

(21) Appl. No.: 15/672,382

(22) Filed: Aug. 9, 2017

(65) Prior Publication Data

US 2017/0336027 A1  Nov. 23, 2017

Related U.S. Application Data

(62) Division of application No. 14/488,978, filed on Sep. 17, 2014, now Pat. No. 9,759,378.

(51) Int. Cl.
*F17C 1/02* (2006.01)
*F16L 23/08* (2006.01)
*F16L 21/06* (2006.01)

(52) U.S. Cl.
CPC .............. *F17C 1/02* (2013.01); *F16L 21/065* (2013.01); *F16L 23/08* (2013.01)

(58) Field of Classification Search
CPC .............. A61B 17/1611; A61B 17/295; A61B 18/1445; A61B 17/320016; A61B 17/29; A61B 90/03; A61B 34/30; A61B 2018/1452; A61B 2017/2923; A61B 2017/2915; A61B 2017/2913; A61B 2017/00353; A61B 17/3201
See application file for complete search history.

(56) References Cited

U.S. PATENT DOCUMENTS

| | | | |
|---|---|---|---|
| 1,876,455 | A | 9/1932 | Inshaw |
| 2,271,425 | A | 1/1942 | Harris |
| 2,766,999 | A | 2/1954 | Watts |
| 4,601,495 | A | 7/1986 | Webb |
| 7,654,587 | B2 | 2/2010 | Gibb |

(Continued)

FOREIGN PATENT DOCUMENTS

WO    02098628 A2    12/2002

*Primary Examiner* — John C Hong
(74) *Attorney, Agent, or Firm* — Naval Information Warfare Center, Pacific; Kyle Eppele; Arthur K. Samora (57) ABSTRACT

A pressure clamp for connecting pressure vessel segments and method can include a pair of semi-circular sections, which can be placed around the ends of the segments, so that there is a slight gap between the semi-circular sections. The inner surfaces of the semi-circular sections can be formed with two notches with beveled surfaces. The beveled surfaces can engage corresponding slanted surfaces on the segment ends, to urge the segments towards each other as the clamp is tightened. A pair of jack screws can be threaded through the semi-circular sections so that the jack screws extend slightly outwardly from one of the sections and contact the other section at the beginning of the tightening process, to establish an initial assembly gap. As fasteners tighten the clamp around the segment, the jack screws can be backed out to maintain a uniformly decreasing assembly gap between the semi-circular sections.

4 Claims, 8 Drawing Sheets

(56) References Cited

U.S. PATENT DOCUMENTS

| | | | |
|---|---|---|---|
| 10,036,493 B2 * | 7/2018 | Vandal | F16L 17/04 |
| 10,184,599 B2 * | 1/2019 | Bird | F16L 21/022 |
| 2009/0200799 A1 | 8/2009 | Dole | |
| 2009/0208280 A1 | 8/2009 | Van De Putte | |
| 2011/0049879 A1 | 3/2011 | Fitzpatrick | |
| 2015/0176728 A1 | 6/2015 | Bowman | |

* cited by examiner

CYLINDRICAL PRESSURE VESSEL CLAMPING METHOD

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 106625.

FIELD OF THE INVENTION

The present invention pertains generally to fastening systems. More particularly, the present invention pertains to clamping devices that can be used to assemble components of a system that is under pressure. The present invention can be particularly, but not exclusively, useful as a clamping device that provides a more reliable watertight seal between cylindrical pressure vessel body segments or end caps, while also allowing for easy assembly and disassembly of the segments/end caps.

BACKGROUND OF THE INVENTION

Fastening systems for assembly components of an underwater vessel are known in the prior art. Some of these aforementioned systems can incorporate a pair of hemispherical clamps, which can be used to mate adjacent body segments. The hemispherical clamps can extend approximately 178 degrees around the circumference of the hull, and the clamps can be placed around a single O-ring and tightened to function as the sealing mechanism for adjacent vessel segments.

But single O-ring type systems of the type described above can have several disadvantages. First of all, these types of systems can be subject to single point failure, which could cause loss of investment of the contents of the vessel or the vessel itself. Additionally, the prior art systems can be challenging to install, as the two clamps do not meet face to face, but instead have a two degree gap between them for adjustment and tolerance variability. Installation is also made more challenging because of their necessarily tight fit. Because of the required tight fit, the clamps must be pressed on sometimes with the help of a mallet, which can make it very difficult to maintain symmetric gaps between front and back clamps.

Another issue with the aforementioned gap is the challenge of maintaining equal gap front and back as the screws are tightened. Consistency in the gap is needed for the mating fasteners to tighten properly. If the gap is inconsistent, the clamp's mating fasteners may not able to be torqued due to the gap and mirrored screw geometry. When tightened, the screws fight each other for tension. With an uneven gap, as one screw is tightened the other loosens negating any torque value. This gap is also utilized during removal where a rod or screwdriver is inserted into the gap and struck with a mallet to force the clamps off. Both the clamps and the vessels can be damaged during the removal process.

One way to solve the above problems could be to use a standard Marmon clamp to mate the two adjacent segments. But Marmon clamps can also produce additional disadvantages, such as non-compact design, difficult mating, and protruding features which could increase the hydrodynamic draft of the overall vessel, and which could also snag objects along the outside of a moving UUV (pressure vessel).

In view of the above, it is an object of the present invention to provide a pressure vessel clamping device that allows for mating of segments in a manner which keep the outside diameter consistent along its length, for increase hydrodynamic efficiency during deployment, operation and retrieval. Another object of the present invention is to provide a pressure vessel clamping device that provides increased higher reliability of the watertight seal. Another object of the present invention is to provide a pressure vessel clamping device that provides for a consistent gap forward and back to prevent uneven gap and iteration of assembly. Yet another object of the present invention to provide a pressure vessel clamping device that maintains a consistent gap size during assembly, and which provides a resistance that allows the mating fasteners to be torqued during assembly. Still another object of the present invention to provide a pressure vessel clamping device that can be easily and quick assembly and disassembly of pressure vessel segments. Yet another object of the present invention to provide a pressure vessel clamping device that allow for disengagement of the clamping device without damaging the device or the pressure vessel segments. Another object of the present invention to provide a pressure vessel clamping device which can be easy to manufacture, and which can be used in a cost-efficient manner.

SUMMARY OF THE INVENTION

A pressure clamp for connecting a first segment of a pressure vessel to a second segment of the vessel, and methods for use, can include a pair of semi-circular sections. The semi-circular section can be placed around the end of the first segment and second segment, so that there is a slight assembly gap between the semi-circular sections, with the assembly gaps at both ends being substantially the same. The inner surfaces of the semi-circular section can be formed with a two notches, with each notch having a beveled surface. The beveled surface can define a decreasing distance between the beveled surfaces, from a maximum distance at the inner surface of the semi-circular sections, which can taper to a minimum distance proximate the outer surface of the semi-circular sections. The beveled surfaces can engage a slanted surface on the first segment end and the second segment end to urge the segments towards each other as the clamp is tightened using fasteners.

The clamp and methods for use can also include a pair of jack screws. The jack screws can be threaded into one of the semi-circular section (at the ends) and threaded through until the jack screws extend slightly outwardly from one of the sections so that the jack screws contact the other sections at the beginning of the tightening process to establish the assembly gap. As the fasteners tighten the clamp around the segment, the jack screws can be backed out to maintain a uniform gap between the semi-circular sections as the clamp is tightened. Either of the segment ends can further be formed with at least two recesses. A corresponding O-ring can be placed into each recess, and O-rings can deform as said semi-circular section are tightened around the segments to establish a watertight seal.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
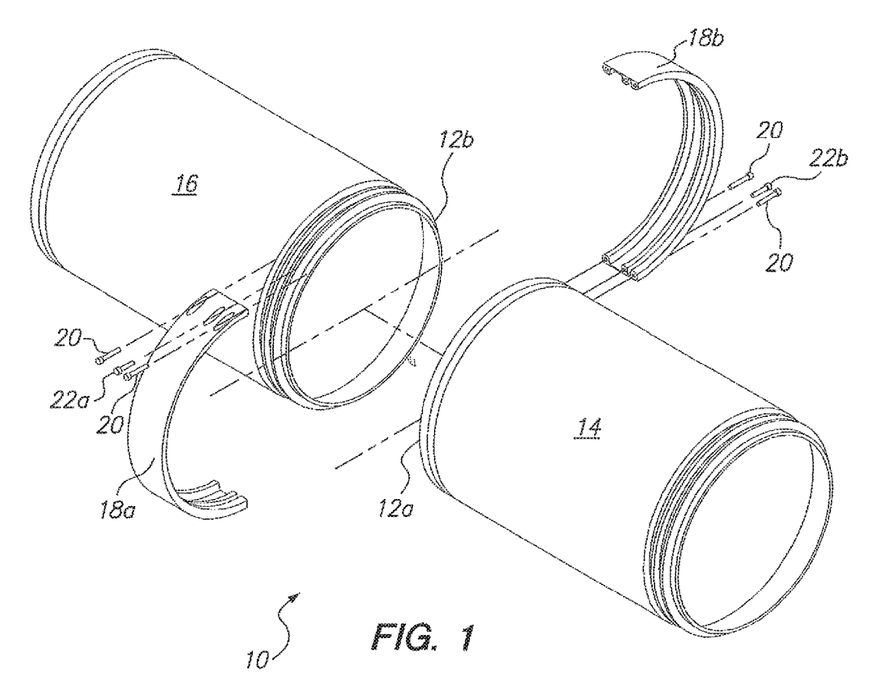
FIG. 1 is an exploded side elevational view of the cylindrical pressure vessel clamping device of the present invention according to several embodiments.
Figure 2:
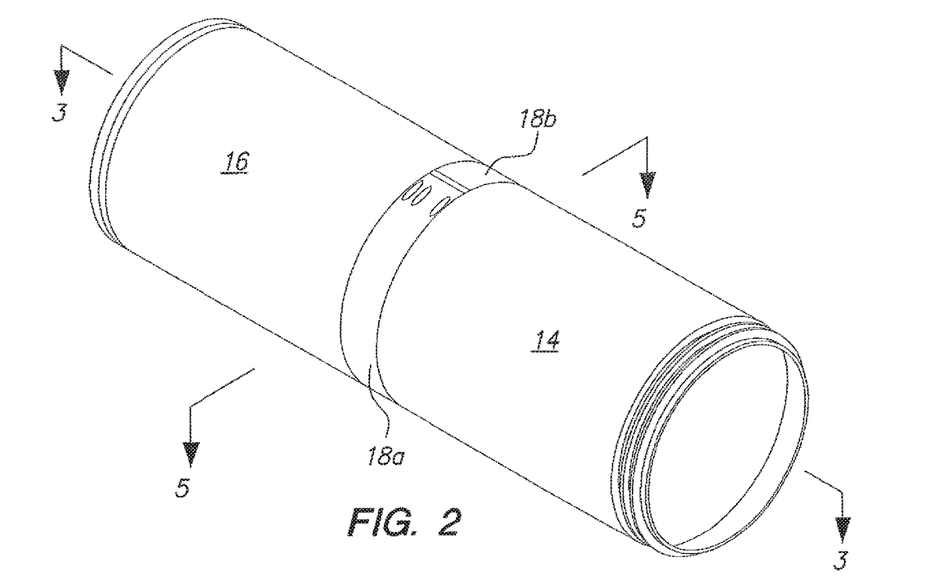
FIG. 2 is the same view as FIG. 1, when the device is assembled.
Figure 3:
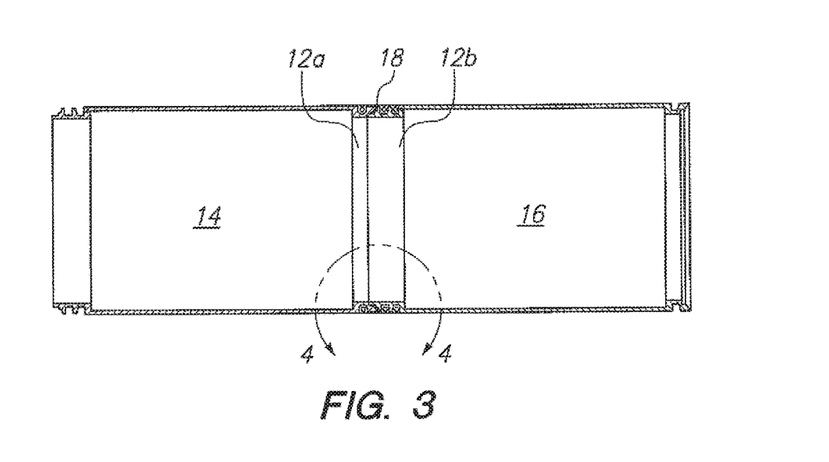
FIG. 3 is a cross-sectional view taken along line 3-3 in FIG. 2.

Referring initially to FIGS. 1-3, a cylindrical pressure vessel clamping device of the present invention according to several embodiments and is shown and is generally designated by reference character 10. As shown, device 10 can be used to connect the ends 12a,b of a first segment 14 and a second segment 16 The clamping device 10 can include a pair of semi-circular clamps 18a, 18b that can be placed around ends 12a and 12b and secured with mating fasteners 20. The device 10 can also include at least two jack screws 22a, 22b, which can be threaded into corresponding semi-circular clamps 18a, 18b, as the semi-circular clamps 18a, 18b are used to clamp ends 12 together. The manner in which the semi-circular clamps 18 cooperate with the ends 12, the mating fasteners 20 and the jack screws 22 to establish a watertight connection can be described more fully below.

The device 10 of the present invention according to several embodiments was developed to provide a more reliable seal between the cylindrical pressure vessel body segments 14, 16, or between a segment 14, 16 or end caps. End caps are not shown in the Figures. However, it should be appreciated that an end cap can be substituted for either segment 14 or 16, or any segment for the vessel, provided the end cap has the corresponding structure at its end 12 to engage the semi-circular clamps 18 (either the structure of end 12a or of 12b, as described more fully below).

The device 10 of the present invention is an improvement over existing designs, in that it can allow for easy assembly and disassembly of the device. More specifically, the clamps in the prior art can be challenging to install as they do not meet face to face but instead have a slight gap between the semi-circular clamps, which can allow for adjustment and tolerance variability. But the gap for the prior art device can make installation more challenging because of their necessarily tight fit. The semi-circular clamps often must be pressed on (sometimes with the help of a mallet) and therefore are very difficult to maintain symmetric gaps between front and back clamps. Another issue with the aforementioned gap is the challenge of maintaining equal gap front and back as the screws are tightened. Consistency in the gap is needed for the mating fasteners to tighten properly. Additionally, the clamp's mating fasteners are not able to be torqued due to this gap and mirrored screw geometry. When tightened, the screws fight each other for tension. Therefore, as one screw is tightened the other loosens negating any torque value.

This slight gap for the clamps in the prior art has also been used during removal of the prior art clamps from the vessel. More particularly, a rod/screwdriver or similar structure has often been jammed into the gap and pounded on with a hammer or mallet to force the clamps off, because the clamps themselves do not have features for self-extraction. As a result, the prior art clamps can often become damaged in the process of removal. The underwater pressure vessel clamping device of the present invention can add a jack screw 22 feature and other structure as described below, to avoid these disadvantages. Additionally, and as can be seen in FIGS. 2 and 3, the device 10 of the present invention can result in pressure vessel (once segments 14 and 16 are assembled), with a streamlined, hydrodynamic configuration, over the prior art clamps, which can have protrusions that can decrease the hydrodynamic efficiency of the assembled vessel, and that can get caught or snagged on kelp, trash, or other underwater items, or the ocean floor.

Figure 4:
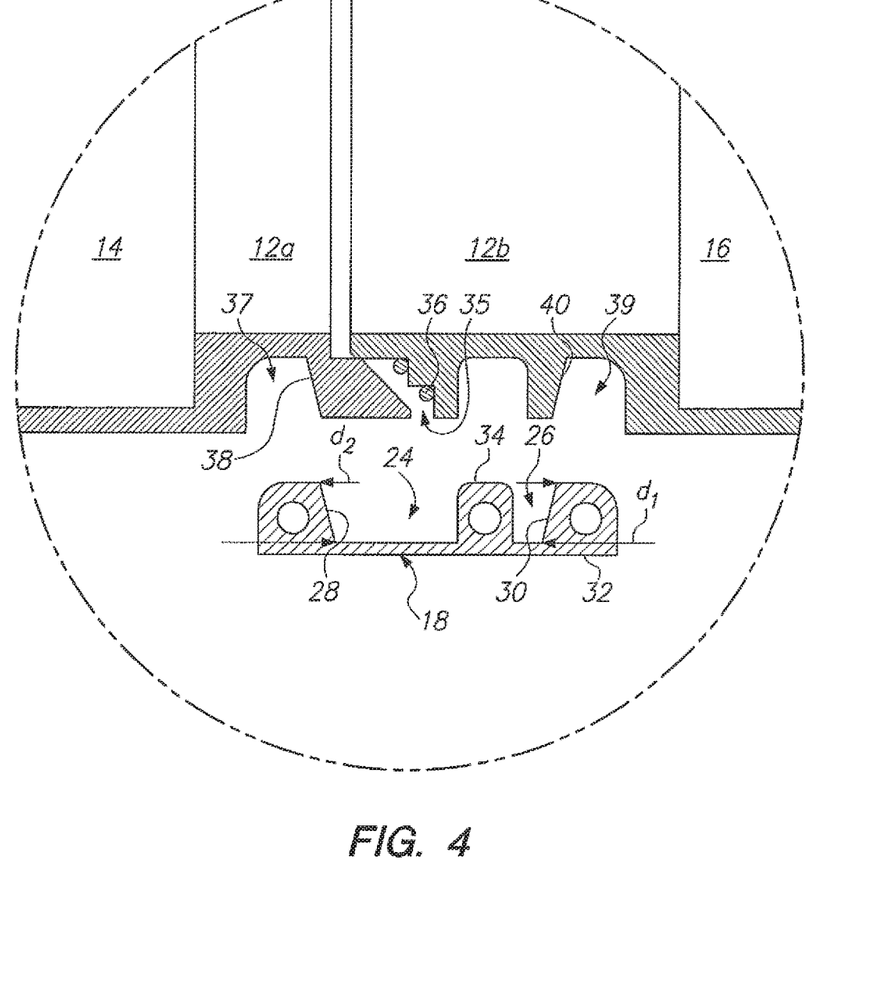
FIG. 4 is a greatly enlarged cross-sectional view taken along line 4-4 in FIG. 3.

Referring now to FIG. 4, the structure of the semi-circular clamps 18 and ends 12a, 12b can be seen in greater detail. As shown, semi-circular clamps 18 can include at least two notches 24, 26, which can be formed in the clamp by means known in the art, such as milling, machining, etc. Each notch 24, 26 can be formed with at least one beveled surface 28, 30 as shown in FIG. 4. The beveling of beveled surface 28, 30 can result in notches where can have a minimum distance $d_1$ between the beveled surfaces 28, 30 proximate outer surface 32 of clamp 18. The minimum distance $d_1$ can have an increasing taper or gradient to a maximum distance $d_2$ between beveled surfaces 28, 30 at the inner surface 34 of clamp 18.

Figure 7:
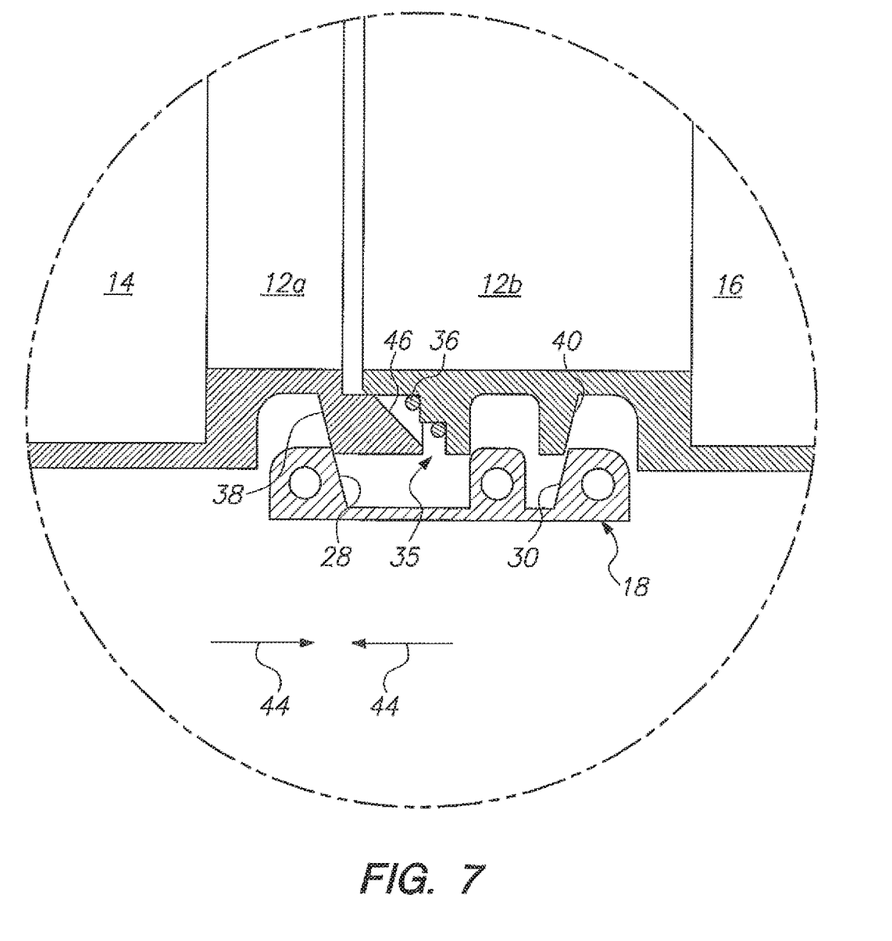
FIG. 7 is the same view as FIG. 4, taken at the beginning of the clamp installation process according to several embodiments.
Figure 8:
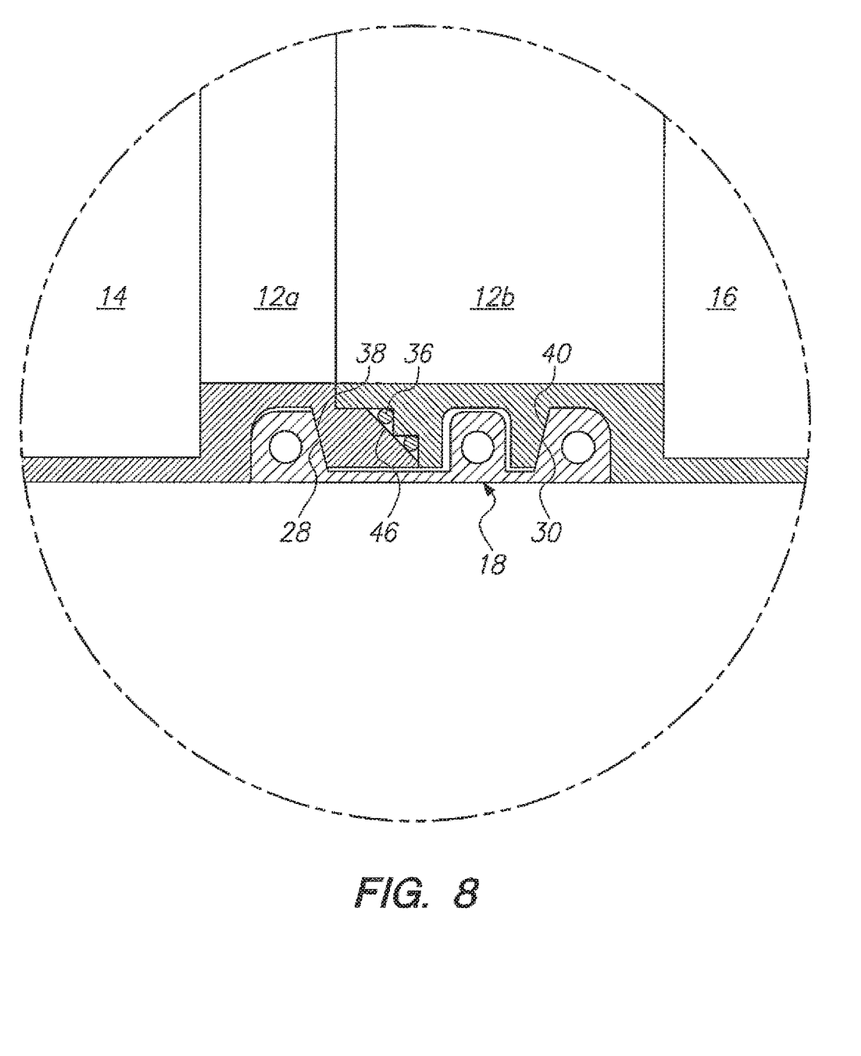
FIG. 8 is the same view as FIG. 7, taken at the end of the clamp installation process.

As shown in FIGS. 4 and 7-8, the structure of the ends 12 can be adapted to facilitate mating of segments 14 and 16. More specifically, ends 12a and 12b can be formed with respective grooves 37, 39. Grooves 37, 39 can each be formed with a respective slanted surface 38, 40. Slanted surfaces 38 and 40 can engage respective beveled surfaces 28 and 30 when semi-circular clamps are placed around end 12a and 12b and tightened. End 12a can be formed with an inclined surface 46 (Please see FIGS. 7 and 8), and end 12b can further be formed with at least two recesses 35, and O-rings 36 can be placed into each corresponding recess 35. It should be appreciated that the number of recesses 35 and O-rings 36 in end 12b, as well as the O-ring durometer, can be chosen according to the desired design depth of the vessel segments. Additionally, the recesses 35 could also be formed in end 12a vice 12b without departing from the scope of the present invention, as long as the O-rings 36 becomes deformed during tightening on the semi-circular clamps 18, to establish the watertight seal for segments 14, 16. Stated differently, the recesses can be on either end 12a, 12b, provided the inclined surface 46 is on the other of ends 12a, 12b to cause deformation of the O-rings during operation of the device 10 to assemble segments 14 and 16.

Figure 5:
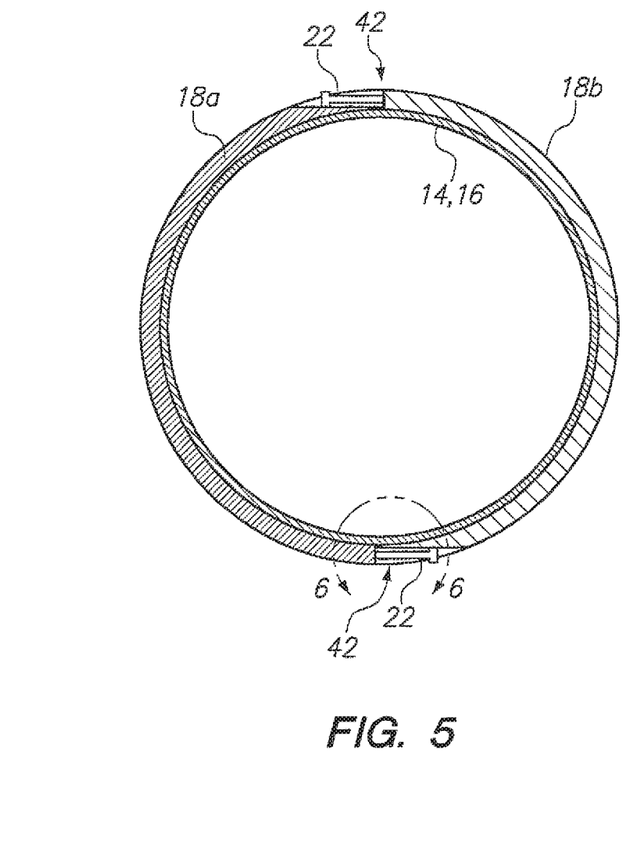
FIG. 5 is a cross-sectional view taken along line 5-5 in FIG. 2.
Figure 6:
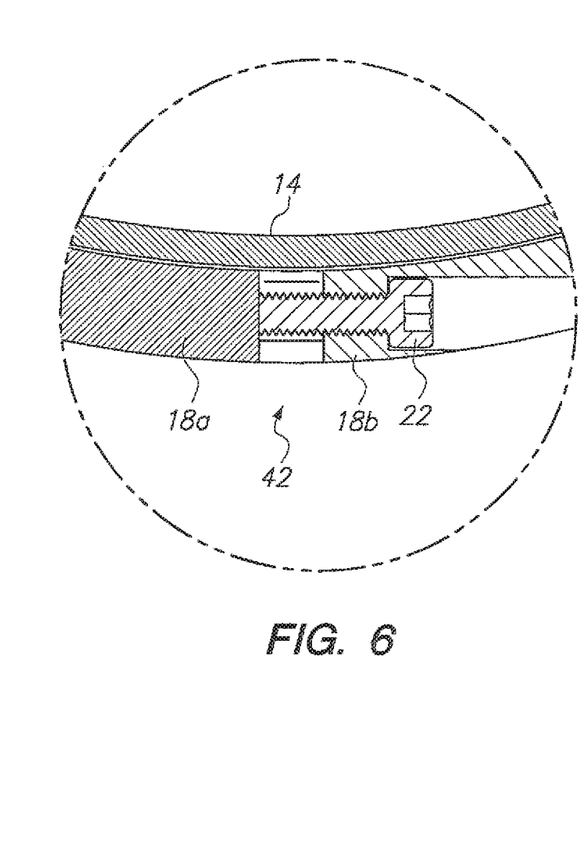
FIG. 6 is a greatly enlarged cross-sectional view taken along line 6-6 in FIG. 5, taken at the beginning of the clamp installation process according to some embodiments.

As shown in FIGS. 5 and 6, a pair of jack screws 22 can be threaded into semi-circular clamps 18a and 18b. The jack screws 22 can allow for torquing of the mating fasteners 20 during installation of the device on the first and second segments 14, 16. The jack screws 22 can also provide a simple, integrated way to remove the clamps, and further allow for a consistent assembly gap 42 at both ends of clamps 18a, 18b during assembly, as described below. More specifically, as the clamps are tightened the O-rings are brought together and sealed, during assembly and use, the jack-screws provide a base to torque against once the rings are sealed.

For installation of the device 10, and referring now to FIGS. 5-9, the O-rings 36 can be greased and can then be placed in corresponding recesses 36. Segments 14 and 16 can be placed end 12a to end 12b, and held in position as the clamps 18 are added by placing clamps 18a, 18b around ends 12a, 12b. At this time the jack screws 22 can be threaded into clamps 18. Each jack screw 22 can be threaded through one of semi-circular clamps 18a, 18b until it contacts the other of clamps 18a, and 18b. This can establish a first configuration, wherein there is a uniform assembly gap 42 at both interfaces (ends) of semi-circular clamps 18a, 18b, as shown in FIGS. 5 and 6.

Once the jack screws 22 are threaded as describe above, the mating fasteners 20 can be tightened and torqued. To do this, each jack screw 22 can be backed out slightly, or unscrewed, the same amount. Next, the mating fasteners 20 can be tightened until the jack screws 22 again contact the clamps 18 (but with a smaller assembly gap 42). Once the slightly back-out jack screws 22 again contact the semi-circular clamps, the jack screws 22 can again provide the resistance, which can allow the mating fasteners 20 to be torqued to their predetermined design limit, the jack screws can be threaded out by a couple of threads. The mating fasteners can then be tightened again until the design torque for the mating fasteners.

Figure 9:
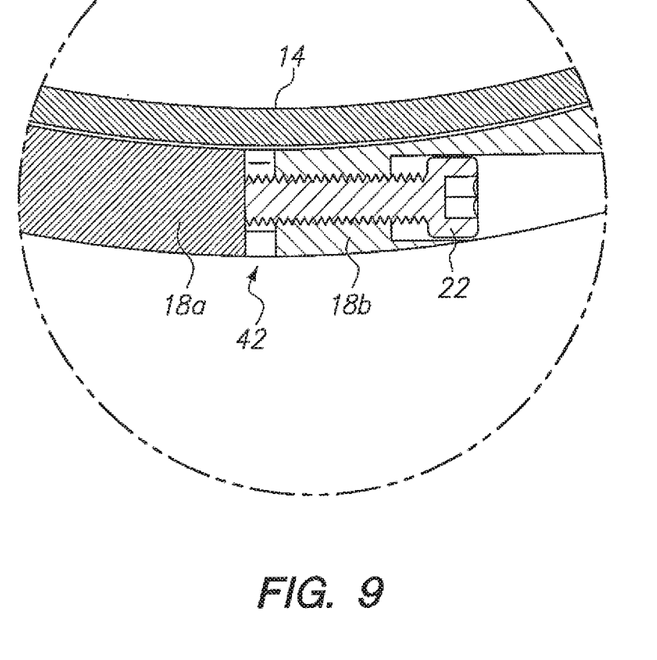
FIG. 9 is the same view as FIG. 6, but taken at the end of the clamp installation process; and, FIG. 10 is a block diagram that is representative of steps that can be taken to practice the methods of the present invention according to several embodiments

The above process can be repeated. As this occurs, the assembly gap 42 becomes smaller and the semi-circular clamps 18 can become tightened around ends 12. The entire process can be repeated until the desired assembly gap 42 is reached (at this point the device 10 can have a second configuration, wherein assembly gap 42 is at a minimum, as shown in FIG. 9), or the process can be repeated until a second configuration is reached wherein assembly gap 42 is completely closed and semi-circular clamps 18 contact each other at the ends of the clamps 18. From, the above, it should be appreciated that the jack screws 22 greatly facilitate the assembly of the device by maintain a uniform assembly gap 42 between the ends of the semi-circular clamps 18 during tightening of the clamps. The added benefit of having the jackscrew in place is to avoid fouling during use.

As the semi-circular clamps 18 are tightened with mating fasteners 20, the beveled surfaces 28, 30 of the clamps can engage the corresponding slanted surface 38, 40 of respective segment ends 12a, 12b. As this occurs, the engagement of beveled surfaces 28, 30 with slanted surfaces 38, 40 can cause ends 12a and 12b to be urged towards each other, in the direction indicated by arrows 44 in FIG. 7. As this occurs, the inclined surface 46 of end 12a moves toward recesses 35 until inclined surface 46 of end 12a contacts end 12b. Once this occurs, the O-rings 36 can become deformed within recesses 35 to thereby aid in the formation of a watertight seal for segments 14 and 16.

For removal of the semi-circular clamps 18 and disassembly of segments 14, 16, the mating fasteners 20 can be loosened and the jack screws 22 can be tightened to establish a leveraging action, which pries the semi-circular clamps 18a and 18b apart. Damage to the clamps and unnecessary damage of sensitive internal components can be avoided if jack screws are used instead or a prior mallet and screwdriver to remove the clamps. In some embodiments of the invention, the jack screws can be removed and the mating fasteners 20 can be loosened so that they are just a couple threads into the opposing clamp and are loose but still captured and holding the clamps from falling out of the clamps 18. Then, longer versions of the jack screws can be added and tightened turning about half a turn in sequence and repeated until the mating fasteners bottom out or the clamps become loose. Thus, the self-extraction features of the device 10 of the present invention according to several embodiments can become apparent.

Figure 10:
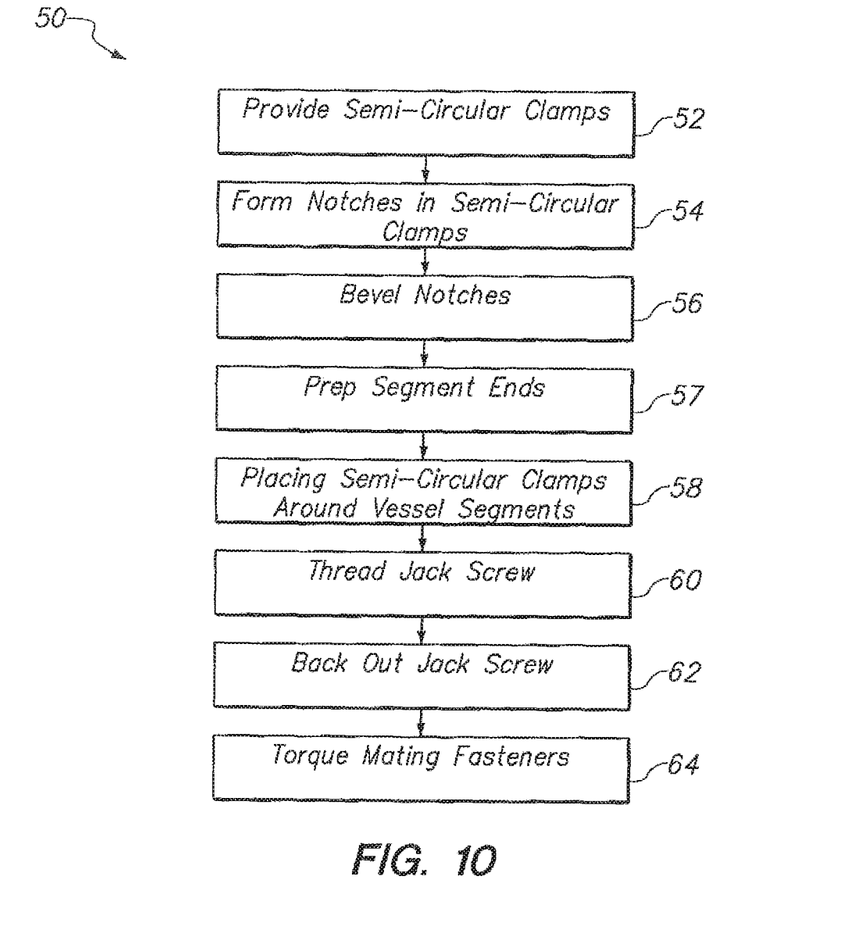

Referring now to FIG. 10, the methods of the present invention according to several embodiments can be depicted using the block diagram, which is designated using reference character 50. As shown, the methods can include the initial step of providing semi-circular clamps 18, as shown by box 52. Next, the methods can include the steps of forming notches 24, 26 in the clamps 18 as shown by box 54, and beveling the notches to establish a respective beveled surface 28, 30 for each notch 24,26, as shown by box 56. As shown by step 57, the methods can include the step of prepping the end 12a and 12b and segments 14 and 16. For this specification, what is meant by prepping the ends 12 is establishing the recesses 35, O-rings 36, inclined surface 46 and slanted surfaces 38, 40 structure for the ends 12, as described above.

Next, and as also shown by box 58, the methods can include the step of placing the semi-circular clamps 18 around the ends 12 of segments 14, 16 and attaching the clamps to each other. To do this, the jack screws 22 can be threaded into the clamps 18 (as depicted by box 60) until the initial assembly gap 42 is established. The jack screws 22 can be selectively backed out as shown by box 62 and the mating fasteners can be torqued, as shown by box 64 and the mating fastener 20 can again be torqued. Steps 62 and 64 can be repeated until the inclined surface 46, recess 35 and O-ring structure of ends 12 have cooperated to establish the watertight structure for segments 14, 16, and/or until assembly gap 42 has vanished and semi-circular clamps 18 contact each other at the ends of the clamps 18. For disassembly, the mating fasteners can be loosened and the jack screws 22 can be threaded into the clamps 18 as described above, to accomplish disassembly of the device 10 without striking the device with a mallet or similar tool.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for connecting a first segment of a pressure vessel to a second segment of said pressure vessel, said first segment having a first segment end formed with a first groove, said second segment having a second segment end formed with a second groove, said method comprising the steps of:
   A) forming a first slanted surface in said first groove and a second slanted surface in said second groove;
   B) providing first and second circular clamp sections for securing said first segment end to said second segment end, said first and second circular clamp sections each having an outer surface and an inner surface, said first circular clamp section's inner surface and second circular clamp section's inner surface being formed with respective first and second beveled surfaces;
   C) forming a pair of stepped recesses in said second segment end;
   D) placing an O-ring in a corresponding said stepped recess;
   E) placing said circular clamp sections around said first segment and said second segment;
   F) tightening said circular clamp sections to each other with mating fasteners, said tightening step causing said first beveled surface to engage said first slanted surface in said first groove and said second beveled surface engaging said second slanted surface in said second groove to urge said first segment towards said second segment;
   wherein said first segment has a tapered surface distal to said first groove; and,
   wherein said tightening step causes said O-rings to deform to take the shape of said stepped recesses and said tapered surface to cover and abut said pair of stepped recesses to form a watertight seal for said first segment and said second segment.

2. The method of claim 1, wherein said first segment, said second segment, said first outer surface and said second outer surface are all flush with each other once said tightening step is accomplished.

3. The method of claim 1, further comprising the step of:
   G) threading a jack screw into a respective said circular clamp section so that said jack screw extends outwardly from one of said circular clamp section and contacts the other said semi-circular section, to establish a gap therebetween when said circular clamp sections are placed around said first end and said second end.

4. The method of claim 3, further comprising the steps of:
   H) unscrewing until each said jack screw no longer extends from a corresponding circular clamp section and said circular clamp sections contact each other, said step H) being accomplished concurrently with said step F).

* * * * *